July 26, 1955  A. H. SAUER, JR  2,713,782
CLAMP PLATE FOR EARRING
Filed Aug. 22, 1952

INVENTOR.
ALBERT H. SAUER, JR.
BY
Joseph A. Rave
Attorney

United States Patent Office 2,713,782
Patented July 26, 1955

2,713,782

CLAMP PLATE FOR EARRING

Albert H. Sauer, Jr., Cincinnati, Ohio; Gertrude K. Sauer, administratrix of said Albert H. Sauer, Jr., assignor to A. Sauer and Co., Inc., Cincinnati, Ohio, a corporation of Ohio Application August 22, 1952, Serial No. 305,759

4 Claims. (Cl. 63—14)

This invention relates to improvements in earrings and particularly to the means for securing or attaching an earring to the ear lobe.

Earrings, particularly of the screw clamp type, are generally provided with a clamping head that is securely attached to the clamp screw for movement therewith during the clamping or attaching of the earring. This construction frequently causes irritation to the ear since the clamping head will rotate against the ear lobe during the final clamping and thereby possibly abrade the skin. In the past there has been attempts made to provide a clamping plate to have independent movement on the clamp screw wherefore the clamping plate did not abrade the skin, since, once it contacted the ear lobe it remained stationary while the clamp screw was actuated in effecting the clamping. This clamping plate construction, however, was made permanently on the clamp screw and is quite expensive to produce and consequently is limited to the expensive jewelry items or earrings.

The present invention contemplates the provision of a clamp plate which is independently movable on the clamp screw as is readily separable from the clamp screw and can be transferred from earring to earring by the user, wherefore, the clamp plate can be employed with the less expensive earrings such as that generally placed in the category of costume jewelry.

It is, therefore, the principal object of the present invention to provide a clamp plate for an earring clamp screw that can be attached and removed from the clamp screw at will.

Another object of this invention is the provision of an earring clamp plate for accomplishing the foregoing object that is economical to produce and acquire wherefore it will have universal appeal.

A still further object of the present invention is the provision of a clamp plate for an earring clamp screw that may be formed from a single piece of material such as stainless steel of a relatively thin gage, yet, when mounted in position is secure against inadvertent displacement.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings.

Throughout the several views of the drawings similar reference characters are employed to denote the same or similar parts.

Figure 1:
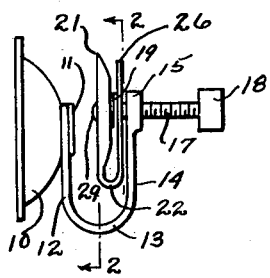
Fig. 1 is an elevational view of an earring having mounted thereon the improved clamp plate of the present invention.

The earring illustrated in the drawings may take any suitable or desirable form and not necessarily the specific form illustrated. As illustrated an ornamental member or mounting 10 is provided rearwardly with a lug or projection 11 through which it is attached to one arm 12 of a U-shaped clip 13. The second arm 14 of the clamp 13 is provided at its upper end with an enlarged portion 15 substantially centrally internally threaded as at 16. The enlarged threaded portion 15 is in effect a nut having threaded thereinto a clamp screw 17. The clamp screw 17 is provided on its outer end with a knob 18 through which it is actuated and on its inner end with a head 19, generally employed as the clamp member that engages one side of the ear lobe for clamping the same between itself and the base of the earring ornament.

It is this construction that results in discomfort to the user or wearer and this head 19 is sometimes enlarged to provide a greater clamping surface with the result that greater discomfort is caused to the wearer. The purpose for an enlarged clamping plate is to insure a greater clamping action between the parts and minimize loss of the earrings when the wearer is exercising, dancing, and the like.

Figure 2:
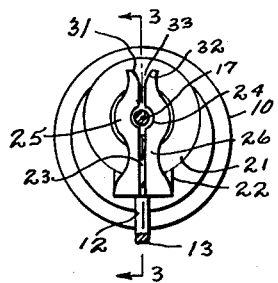
Fig. 2 is a transverse sectional view through Fig. 1 taken on line 2—2 on said Fig. 1.
Figure 3:
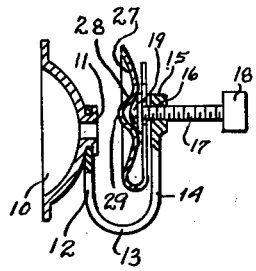
Fig. 3 is a vertical sectional view through the earring of Fig. 1 as seen from line 3—3 on Fig. 2.
Figure 8:
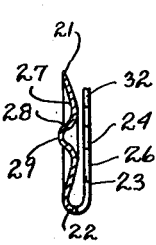
Fig. 8 is a vertical sectional view of the detachable earring clamp plate as finally formed from the blank of Fig. 4.
Figure 4:
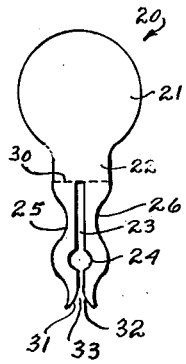
Fig. 4 is an extended plan view of a blank from which the clamp plate is formed.

The clamp plate illustrated in Figs. 1 to 4, inclusive, and removably attached to the clamp screw 17 is loosely mounted when in final clamping position and is formed from the blank 20 ilustrated in Fig. 4. Specifically the blank 20 comprises a disc 21 from which projects a tongue 22. The tongue 22 may take any suitable or desirable outline in plan, with said outline being dictated both by taste and from the view point of reducing to a minimum the amount of material or metal, since the clamp plate along with the earring should be as light in weight as practical. The tongue 22 of the blank is slit from its outer end toward the disc 21, as at 23, with said slit stopping short of the disc 22. Straddling the slit 23, and near the outer end thereof, the tongue 22 is provided with an aperture 24. It will be appreciated that the slit 23 provides in the tongue 22 on each side thereof a finger, respectively indicated by the reference numerals 25 and 26.

The blank of Fig. 4 is now subject to forming and bending dies resulting in the disc having a concaved or cup-shaped cross section as in Fig. 3, and indicated by the reference numeral 27. Substantially centrally of the disc it is outwardly formed as a cone 28 with its outer end rounded as at 29. The tongue 22 is then bent substantially at the base of the slit 23 to stand upright behind the disc 21, or cup 27, and which cup 27 has its concave portion and cone 28 projecting toward the back of the earring ornament; dotted line 30 on Fig. 4 indicates the approximate bend line of the tongue.

The clamp plate illustrated in Figs. 1, 2 and 3 and its mounting on the clamp screw 17 is believed obvious from Figs. 2 and 3.

However, briefly, the mounting of the clamp plate is effected by forcing the portion of the clamp screw 17 immediately behind the head 19 thereof and forwardly of the clamp nut 15 into the slit 23 at the outer end of the tongue 22, or between the fingers 25 and 26, and through said slit to the aperture 24. In order to assist in this operation the ends of the fingers 25 and 26, on each side of the slit 23, are cut away or rounded as at 31 and 32 thereby providing an entrant throat 33 to the slit 23. By exerting reasonable pressure on the clamp plate the arms 25 and 26 are sprung away from one another permitting the clamp screw 17 to pass therethrough to the aperture 24 whereupon the fingers 25 and 26 assume their normal positions and surround the clamp screw. As illustrated in Fig. 2 the aperture 24 is of sufficiently greater diameter than the diameter of the clamp screw 17 to provide clearance therebetween and permit free rotation of the clamp plate on the clamp screw. It should also be noted that in passing the clamp screw 17 between the clamp plate fingers 25 and 26 the clamp screw head 19 slightly separated the tongue 22 from the plate or disc 21 until the said clamp screw head 19 was aligned with the underside of the cone 28 whereupon the parts take the positions illustrated in Fig. 3.

In operation, the clamp plate upon contact with the ear lobe will be held thereby against any rotation with the clamp screw during the final actuation of the said clamp screw. Further screwing of the clamp screw will actuate the clamp plate toward the ear and will cause the ear lobe to enter the concavity thereof between its rim and the central cone and thereby prevent the loss of the earring. This attachment of the parts is partly caused by a vacuum within the concavity of the clamp plate due to the forcing out of the air in said clamp plate concavity 27 by the entrance of the ear lobe thereinto during the final clamping of the parts. It should be noted that the screw attachment of the parts is obtained without an excessive amount of squeezing pressure on the ear lobe as would be necessary if only the head 19 of the clamp screw 17 were employed in effecting this attachment.

It will be appreciated that the clamp plate can be readily disassociated from the clamp screw by merely pushing the same relative to the screw in the direction opposite to that in which it was actuated in applying same to the screw.

Figure 5:
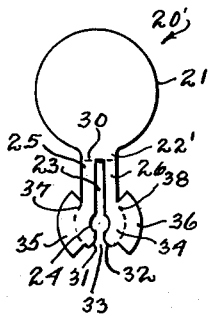
Fig. 5 is an extended plan view of a modified blank for providing a modified clamp plate that will accomplish the results of that of Figs. 1 to 4.
Figures 6, 7:
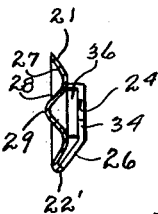
Fig. 6 is a top plan view of the finished clamp plate made from the blank of Fig. 5.
Fig. 7 is a vertical sectional view through the modified clamp plate as seen from line 7—7 on Fig. 6.

The modification illustrated in Figs. 5, 6 and 7 consists merely in providing the outer end of the tongue 22' with a disc-like portion 34 with segmental flanges 35 and 36. This modified blank then has the flanges 35 and 36 upwardly bent on the fold lines 37 and 38 to thereby provide, when the tongue 22' is folded on its bend or fold line 30, a cylindrical projection from the back of the clamp plate or disc 21. Said cylindrical projection is provided with an open upper end 39 through which the clamp screw head 19 passes to permit the screw to enter the slit 23 and gain entrance to the aperture 24, substantially centrally of the disc 34.

The blank of Fig. 5 is formed in substantially the same manner as the blank of Fig. 4 with the resulting clamp plate of Figs. 6 and 7 that is attached to the clamp screw 17 and operates for securing the earring in position in the same manner as above described for the form illustrated in Figs. 1 to 4.

While the foregoing has implied the detachable clamp plate is made of metal, which is preferable, it is to be understood that the same may be formed from any suitable material that may be died, cast or otherwise formed, such for example, as the so called "plastics" and resinous materials.

In view of the foregoing it is believed that the objects initially set forth are accomplished.

What is claimed is:

1. As an article of manufacture a removable clamp plate of a substantially U-shape in vertical cross section for an earring clamp screw and formed from a single blank of material, said U-shaped clamp plate one arm comprising a disc concaved on its forward face forming the clamping disc and providing a relatively large clamping area, said clamp plate second arm comprising a tongue disposed behind the clamping disc, with said tongue longitudinally slit to provide a pair of spring arms, said tongue having an aperture intermediate the ends of the spring arms with said aperture partially formed in each spring arm and with the aperture substantially axially of the clamping disc, and said spring arms at their outer ends being outwardly flared with respect to the slit to provide an entrance to said slit.

2. As an article of manufacture a removable clamp plate of a substantially U-shape in vertical cross section for an earring clamp screw and formed from a single blank of material, said U-shaped clamp plate one arm comprising a disc concaved on its forward face forming the clamping disc and providing a relatively large clamping area, said clamp plate second arm comprising a tongue disposed behind the clamping disc with said tongue longitudinally slit to provide a pair of spring arms, said tongue having an aperture intermediate the ends of the spring arms with said aperture partially formed in each spring arm and with the aperture substantially axially of the disc, said spring arms at their outer ends being outwardly flared with respect to the slit to provide an entrance to said slit, and an arcuate shaped flange from the outer edge of each spring arm downwardly of the ends thereof extending toward the disc.

3. As an article of manufacture a removable clamp plate of substantially U-shape in vertical cross section for an earring clamp screw and formed from a single blank of material, said U-shaped clamp plate one arm comprising a disc concaved on its forward face forming the clamping disc and providing a relatively large clamping area, a substantially cone shaped projection from the base of the clamping disc concavity and having its apex projecting slightly ahead of the clamping disc, said clamp plate second arm comprising a tongue disposed behind the clamping disc with said tongue longitudinally slit to provide a pair of spring arms, said tongue having an aperture intermediate the ends of the spring arms with said aperture partially formed in each spring arm and with the aperture substantially axially of the clamping disc, and said spring arms at their outer ends being outwardly flared with respect to the slit to provide an entrance to said slit.

4. An earring attaching device comprising a U-shaped clip having a pair of arms joined at their lower ends by a base, a threaded aperture at the upper end of one of the clip arms, a clamp screw having an enlarged end in said threaded aperture axially movable relative thereto for actuating said enlarged end toward the other clip arm, a removable clamp plate of substantially U-shape in vertical cross section formed from a single blank of material and comprising in one arm thereof a disc of an area relatively larger than the clamp screw enlarged end with said disc concaved on its forward face, and providing a relatively large clamping area, said clamp plate second arm being in the form of a tongue disposed behind the disc with said tongue longitudinally slit to provide a pair of spring arms so that said spring arms may straddle the clamp screw behind its enlarged forward end, said tongue having an aperture intermediate the ends of the spring arms with said aperture partially formed in each spring arm located substantially axially of the clamp disc and in which aperture the said clamping screw is freely rotatable, and said spring arms having their outer ends outwardly flared with respect to the slit to provide an entrance to said slit.

References Cited in the file of this patent

UNITED STATES PATENTS

| | | |
|---|---|---|
| 1,262,519 | Kline | Apr. 9, 1918 |
| 2,417,117 | Marcus | Mar. 11, 1947 |

FOREIGN PATENTS

| | | |
|---|---|---|
| 429,654 | Great Britain | June 4, 1935 |